Oct. 9, 1951  J. C. TOMUNAK  2,571,075
GASKET MATERIAL AND METHOD OF MAKING SAME
Filed Aug. 23, 1947

John C. Tomunak—INVENTOR
BY George T. Haight
ATTORNEY

Patented Oct. 9, 1951

2,571,075

UNITED STATES PATENT OFFICE 2,571,075

GASKET MATERIAL AND METHOD OF MAKING SAME

John C. Tomunak, Chicago, Ill., assignor to Victor Manufacturing & Gasket Co., Chicago, Ill., a corporation of Illinois Application August 23, 1947, Serial No. 770,258

3 Claims. (Cl. 117—155)

This invention relates to gasket materials and method of making the same, and has for its principal object the provision of a new and improved material and process of this kind.

It is a main object of the invention to provide a gasket material that is compressible to a degree approaching that of cork; is more resistant to tearing than cork; and is impervious or highly resistant to liquids with which it comes into contact such as water, brines, acids and hydrocarbons such as oils, greases, gasoline, etc.; and is highly resistant to heat.

Another object of the invention is to provide a method of making a highly compressible and highly resistant gasket material in a continuous process and at low cost.

Another object of the invention is to provide a process for making a highly compressible and highly resistant gasket material, which process is flexible and capable of producing material designed to meet particular and varying conditions.

Another object of the invention is to provide a gasket material made from relatively low cost materials by an inexpensive process, and consequently made relatively inexpensive without sacrificing quality.

Figure 1:
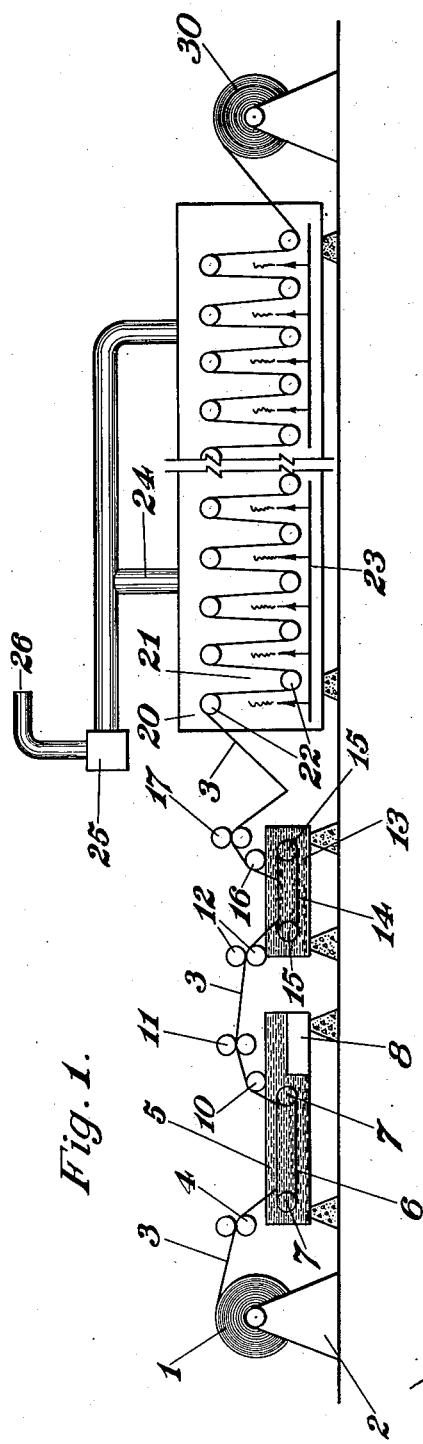
Figure 2:
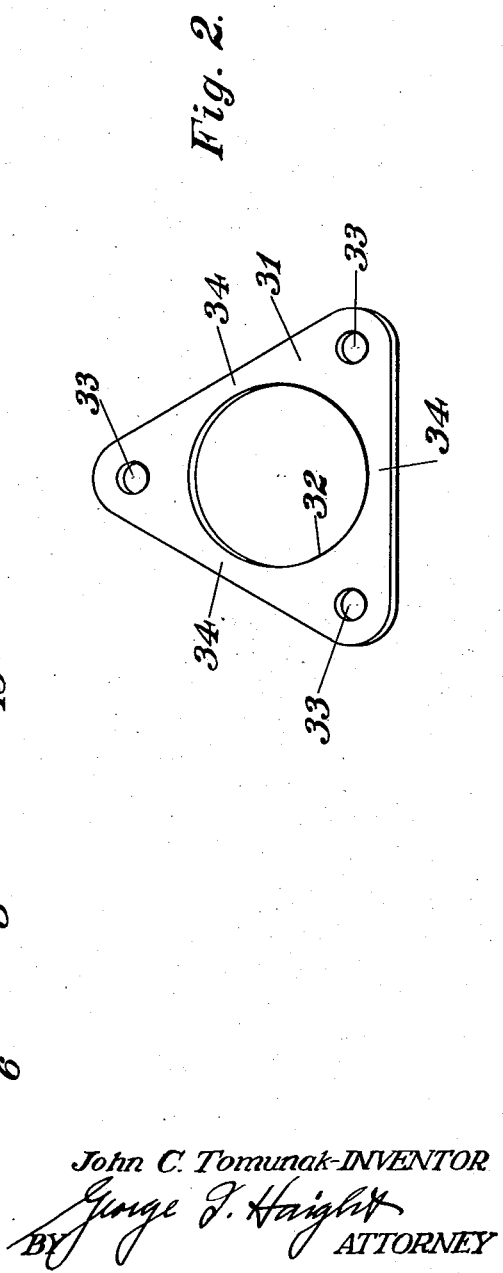

Further objects of the invention not specifically mentioned here will be apparent from the description and claims which follow, reference being had to the accompanying drawings in which a preferred form of the invention is diagrammatically illustrated and in which Fig. 1 is a diagrammatic view illustrating the process of making the gasket material; and Fig. 2 is a plan view of a typical gasket cut from the material.

Gaskets, such as are used to seal water connections, valve mechanism housings, and crank case pans on an internal combustion engine, are frequently made from cork. While cork is highly compressible and relatively unaffected by oils, greases, gasoline, water, and such other elements with which it comes in contact in the engine, it is rather fragile and difficult to handle when setting the gasket in place on the engine. In addition to being fragile cork, when once compressed, retains a permanent set and does not return to its original shape when the compressing pressure is removed. As a result, cork gaskets are seldom reused but rather are replaced whenever removal of the compressing pressure is necessary. The present invention seeks to produce a gasketing material which retains all of the desirable qualities of cork and eliminates the undesirable qualities thereof.

In its preferred form, the material of the present invention is composed of a highly absorbent unsized paper, such as blotting paper, crepe paper, and the like, impregnated with a water dispersion of rubberlike material, preferably synthetic elastomers, fillers and binders, and then cured and dried to produce the finished material.

In the prior art of which I am aware, elastomers, both synthetic and natural, have been used to impregnate fibrous material such as paper, asbestos, and the like. However, in these prior art processes the elastomers have been added to the pulp slurry and the sheet made from this admixture of pulp and elastomer, rather than made by the process of the present invention. In certain prior art processes elastomers have been impregnated into sheet material through the use of volatile solvents which make the process undesirable.

In its preferred form, the process of the present invention starts with a roll of unsized paper, such as blotting paper, of suitable width, thickness, and length, the ribbon of material being unrolled from the roll and passed through a saturant bath being supported therein, so that as the paper is softened by the absorption of water it will not be torn or otherwise injured. Since the paper is completely immersed in the saturant, it will quickly take up its fill thereof and consequently can pass rapidly through the bath. I have found that a total immersion of approximately half a minute will be sufficient in most instances. As the paper emerges from the saturant, it may be passed through squeeze rolls which will remove the excess liquid from it and thereafter the web is again immersed, this time in a bath of coagulant which acts on the solids picked up in the saturating bath to set them in the paper. The web preferably is supported in the coagulant bath the same as in the saturant, and as the web emerges from the coagulant it is passed through a second set of squeeze rolls which remove excess liquid from it. The paper is then passed into a suitable drying equipment where heated air is circulated around it for a period sufficient to dehydrate the paper down to the required low moisture content. This application of heat cures the elastomers within the paper so that the resulting sheet may be rolled without danger of sticking and is in readiness for being cut up to form gaskets.

The particular composition of the saturant used will, of course, depend upon the desired characteristics to be built into the material. Where gaskets made from the material are to be used in engines wherein they will come into contact with hydrocarbons such as oils, greases and gasoline, as well as with water and anti-freeze solutions, elastomers such as the buna synthetics, neoprene, or acrylonitrile may be used advantageously.

Referring now to the drawings in more detail, particularly Fig. 1 wherein the process of the present invention is diagrammatically illustrated, it will be seen that the roll of raw stock 1 is supported by suitable means 2, so that it may be readily unrolled, the web 3 passing between suitable feed rollers 4 and into a bath of saturant 5 wherein it is supported on an endless screenlike belt 6 that encircles suitable pulleys 7 immersed in the bath. The saturant 5 is maintained agitated by suitable stirring equipment diagrammatically illustrated at 8. Feed rolls 4 may be driven by a suitable source of power and the speed controlled to impart the desired speed of travel to the web 3.

The speed of travel of the web 3 and the length of the saturant tank 5 are proportioned so that the web will remain completely immersed in the saturant for a definite period of time, preferably about a half minute. This time may be varied as required to meet particular conditions. The saturant 5 will be varied according to the characteristics that it is desired to make in the material. In one instance, where the gasketing material is to be used in connection with gasoline engines, a saturant consisting of a water dispersion of a butadiene copolymer has been found satisfactory. As a specific example, the saturant may consist of 100 parts water, 100 parts butadiene-acrylonitrile copolymer, 20 parts of clay, 3 parts of sulphur, 1 part of Selenac, 0.16 part of Darvan, 0.12 part of casein, and 0.10 part sodium hydroxide. The name Selenac used above is the name commonly applied to selenium diethyldithiocarbamate, and Darvan is commonly applied to sodium salts of polymerized alkylaryl sulfonic acid.

Another specific example of a satisfactory saturant is: water 165 parts, neoprene 100 parts, zinc oxide 5 parts, phenyl-beta-naphtylamine 2 parts, casein 1.4 parts, Darvan 0.28 part and sodium hydroxide 0.40 part.

With the saturant composed as above, and the web of material 3 consisting of unsized blotting paper, an immersion of one-half minute has been found to be satisfactory. The dispersion made according to the above formulas contains about 40% solids, and it has been found that when immersed for one-half minute in such a dispersion and the excess liquid squeezed out of the paper, the solids picked up by the paper will amount to about 65% of the total material picked up thereby.

To remove this excess moisture from the paper, the web 3 is led out of the saturant 5 over a suitable guide roll 10 and between squeeze rolls 11. The liquid thus removed may fall back into the saturant tank or it may be drained off, as desired.

The web 3 is then passed over suitable guide and feed rolls 12 and into a tank containing a coagulant 13 wherein it is supported on a suitable endless screenlike belt 14 that encircles suitable pulleys 15 in the tank. In the case of the butadiene formula given above, the coagulant preferably consists of acetic acid of 30% concentration. Immersion in the coagulant sets the solids in the paper and eliminates stickiness thereof. The period of immersion preferably is also of the order of one-half minute, after which the web is led out of the coagulant over a suitable guide roll 16 and through suitable squeeze rolls 17 which remove the excess coagulant from it.

The paper is now ready to be dried. There are any number of drying apparatuses which may be used for this purpose. In the example shown, a so-called festoon drier or looper 20 is diagrammatically illustrated, the web 3 following a serpentine path 21 through the drier by being passed over guide rolls 22. Heat is applied by suitable means such as steam pipes, diagrammatically illustrated as being located at points 23 near the bottom of the housing. Air is drawn out from the top of the housing through suitable ducts 24 by means of an exhaust fan 25 and exhausted at 26 to the atmosphere. A comparatively long drying period of the order of three or four hours, with a temperature of 160 degrees F. and an air flow of approximately 12,000 cubic feet per minute, has been found to be satisfactory for dehydrating and curing the material. As the material emerges from the drier, it is re-rolled on a suitable roll 30 and stored in readiness for being fabricated into gaskets of various size and shape.

The material so formed transforms the soft blotting paper into a tough tear-resistant material that is slightly thicker than the original paper and is highly resistant, if not completely impervious, to water, brines, acids, hydrocarbons such as oils, greases, and gasolines, and is capable of withstanding heat in the range of 250 degrees F. without deterioration.

While not quite as compressible as cork the material is sufficiently compressible to form a good gasket and it has a higher recovery than cork, and when a compressing pressure is removed the material will return more nearly to its original thickness than will cork.

In Fig. 2, a gasket, such as might be used in clamping the thermostat housing to a motor block, is shown by way of example. This gasket consists of a main body 31 generally triangular in shape, having a central opening 32 through which water will be circulated, and three smaller openings 33 through which the securing studs will pass. It will be noted that the wall sections at points 34 are comparatively thin, and if a gasket of this type were to be made of a fragile material, such as cork, extreme care would be required to prevent breaking the gasket at these points. With the material made in accordance with the foregoing, the gasket can be roughly handled since it is highly resistant to tearing and will not readily be damaged while being installed in the engine. As the bolts are drawn down to draw the engine parts together, the material in the gasket will be compressed to form a leak-tight seal between the two parts, a seal which will not be affected by any materials likely to come into contact with it. If it becomes necessary to back off the bolts after the gasket has been compressed the gasket will recover most of its original thickness and may be reset if desired.

The material of the present invention is possessed of many advantages. It is made from low cost raw materials which are processed by a relatively simple process that can be carried out without the use of expensive equipment and consequently at low cost. The resulting product is highly compressible and, while perhaps not as highly compressible as cork, it is sufficiently compressible to adapt it to the uses intended. The ability of the material to regain its shape when released from pressure is greater than that of cork. It is tough and highly tear-resistant, and there is no danger that gaskets made from it will be damaged, even though handled rather roughly. The material is impervious to materials with which it is likely to come into contact, in the example shown these materials being water and hydrocarbons such as oils, greases and gasoline. Gaskets made from the material may be made at a low cost without sacrificing quality.

The process of the present invention is advantageous in that it uses a water dispersion, eliminating the hazards attendant in the use of the volatile dispersions of the prior art. The apparatus required is simple and may be built and maintained at low cost.

In the example described by way of illustration, and in the formula given above, the material being manufactured is identified as usable in connection with gaskets with internal combustion engines and the cooling systems thereof. This illustration is given by way of example only, as there are many modifications and adaptations which can be made within the teachings of the invention to produce a material adaptable to other uses. Such modifications and adaptations are contemplated within the teachings of the invention.

Having thus complied with the statutes, and shown and described a preferred embodiment of my invention, what I consider new and desire to have protected by Letters Patent is pointed out in the appended claims.

What is claimed is:

1. Process of forming a gasket material which comprises substantially saturating a highly absorbent paper by impregnating it with an aqueous dispersion containing about 40% solids wherein the solids comprise 100 parts butadiene-acrylonitrile copolymer, 20 parts clay, 3 parts sulphur, 1 part selenium diethyldithiocarbonate, 0.16 part sodium salts of polymerized alkylaryl sulfonic acid, 0.12 part casein, and 0.10 part sodium hydroxide; passing the paper through an acid coagulating bath which sets the solids in the paper, and drying and curing the impregnated paper by an application of heat.

2. The method of forming a gasket material which comprises submerging a ribbon of highly absorbent paper in a bath of water dispersion containing about 40% solids, 100 parts butadiene-acrylonitrile copolymer, 20 parts clay, 3 parts sulphur, 1 part selenium diethyldithiocarbonate, 0.16 part sodium salts of polymerized alkylaryl sulfonic acid, 0.12 part casein, and 0.10 part sodium hydroxide to saturate the paper; passing the ribbon between squeegee rolls to remove excess liquid therefrom; moving the ribbon through the bath of acetic acid to set the solid particles in the sheet and prevent stickiness; passing the ribbon between squeegee rolls to remove excess coagulant therefrom; and drying the ribbon in heated air down to a desired low moisture content.

3. A gasket material formed by the process set forth in claim 1.

JOHN C. TOMUNAK.

REFERENCES CITED

The following references are of record in the file of this patent:

UNITED STATES PATENTS

| Number | Name | Date |
|---|---|---|
| 1,967,863 | Collins et al. | July 24, 1934 |
| 1,996,090 | Wilson | Apr. 2, 1935 |
| 2,097,417 | Neiley | Oct. 26, 1937 |
| 2,147,293 | Hansen | Feb. 14, 1939 |
| 2,240,789 | Kreuz | May 6, 1941 |
| 2,251,295 | Sheesley | Aug. 5, 1941 |
| 2,299,805 | Denman | Oct. 27, 1942 |
| 2,301,998 | Bernstein | Nov. 17, 1942 |
| 2,311,488 | Thomas | Feb. 16, 1943 |
| 2,335,124 | Konrad et al. | Nov. 23, 1943 |
| 2,335,702 | Schur et al. | Nov. 30, 1943 |
| 2,387,429 | Cate | Oct. 23, 1945 |
| 2,399,804 | Hills et al. | May 7, 1946 |
| 2,414,320 | Miller et al. | Jan. 14, 1947 |
| 2,414,391 | Peaker | Jan. 14, 1947 |
| 2,416,447 | Laughlin et al. | Feb. 25, 1947 |
| 2,418,354 | Kern et al. | Apr. 1, 1947 |
| 2,428,771 | Almy | Oct. 14, 1947 |
| 2,453,143 | Lejeune | Nov. 9, 1948 |
| 2,459,874 | Fay | Jan. 25, 1949 |
| 2,474,801 | Owen | June 28, 1949 |
| 2,478,599 | Spanel | Aug. 9, 1949 |
| 2,482,236 | Berglund | Sept. 20, 1949 |
| 2,488,587 | Dreyfus et al. | Nov. 22, 1949 |